United States Patent
Aloisio, Jr. et al.

(10) Patent No.: US 6,215,934 B1
(45) Date of Patent: Apr. 10, 2001

(54) COATED OPTICAL FIBER WITH IMPROVED STRIPPABILITY

(75) Inventors: Charles Joseph Aloisio, Jr., Atlanta, GA (US); Arturo Hale, New York, NY (US); Valerie Jeanne Kuck, Upper Montclair; Peter Gerald Simpkins, Chatham, both of NJ (US); Priya L. Tabaddor, Alpharetta; Carl Raymond Taylor, Lawrenceville, both of GA (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/165,441

(22) Filed: Oct. 1, 1998

(51) Int. Cl.[7] ........................................ G02B 6/02
(52) U.S. Cl. .............................................. 385/128
(58) Field of Search ............................ 385/128; 156/344, 156/584

(56) References Cited

U.S. PATENT DOCUMENTS

| | | |
|---|---|---|
| 4,472,021 | 9/1984 | Ansel et al. . |
| 4,474,830 | 10/1984 | Taylor . |
| 4,844,575 | 7/1989 | Kinard et al. . |
| 4,849,462 | 7/1989 | Bishop . |
| 4,900,126 | 2/1990 | Jackson et al. . |
| 4,962,992 | 10/1990 | Chapin et al. . |
| 5,011,260 | 4/1991 | Marx et al. . |
| 5,062,685 | 11/1991 | Cain et al. . |
| 5,104,433 | 4/1992 | Chapin et al. ........................ 65/3.1 |
| 5,146,531 | 9/1992 | Shustack . |
| 5,373,578 | 12/1994 | Parker et al. ........................ 385/128 |
| 5,373,589 | 12/1994 | Parker et al. . |

FOREIGN PATENT DOCUMENTS

| | | |
|---|---|---|
| 0314174 | 5/1989 | (EP) . |
| 0566801 | 10/1993 | (EP) . |
| 9821157 | 5/1998 | (WO) . |
| 9833081 | 7/1998 | (WO) . |

OTHER PUBLICATIONS

Taylor, C. R., "In Situ Mechanical Measurements Of Optical Fiber Coatings," Digest of Technical Papers, Conference On Optical Fiber Communication, San Diego, CA USA, 1985, pp. 20–21, 1985 Optical Soc of America, Washington, DC USA.

Overton, B. J., et al., "Effects Of Cure Temperature On The Thermomechanical Properties of UV Curable Coatings", ANTEC '88—Plastics in Lightwave Technology; New York, NY, USA, May 1–4, 1988, vol. 29, No. 17, pp. 1165–1168.

Overton, B. J., et al., "Time Temperature Dependence Of Dual Coated Lightguide Pullout Measurements", ANTEC '88—Plastics in Lightwave Technology; New York, NY, USA, May 1–4, 1988, vol. 29, No. 17, pp. 1169–1171.

K. W. Jackson, et al., "The Effect Of Fiber Ribbon Component Materials On Mechanical And Environmental Performance," IWCS Proceedings, 1993, pp. 28–35.

*Primary Examiner*—Frank G. Font
*Assistant Examiner*—Amanda Merlino
(74) *Attorney, Agent, or Firm*—Michael A. Morra

(57) ABSTRACT

An optical fiber [10] having protective coating materials [14, 15], which surround an elongated strand of glass [12], is designed for improved strippability. Preferably, the optical fiber includes two layers (primary and secondary) of radiation-cured polymeric materials surrounding the glass fiber. The primary layer has an equilibrium (in-situ) modulus that resides within the range 120 to 500 psi. Additionally, the primary coating has a pull-out force (adhesion) that is less than 1.2 pounds per centimeter of length (lb/cm), and preferably resides within the range 0.5 to 1.0 lb/cm. It has been found that by increasing the equilibrium modulus, delamination resistance is increased. This has allowed designers to decrease pull-out force while maintaining a suitable delamination resistance. As a result, coating materials can now be stripped away from a glass fiber with little or no residue. This is particularly important in situations where a group of such fibers are bound together in an array [20] by a matrix bonding material [21].

13 Claims, 4 Drawing Sheets

COATED OPTICAL FIBER WITH IMPROVED STRIPPABILITY

TECHNICAL FIELD

This invention relates generally to a protective coating for an optical fiber, and more particularly to a coating that can be easily removed from the optical fiber.

BACKGROUND OF THE INVENTION

In the manufacture of optical fiber, a glass preform rod is suspended vertically and moved into a furnace at a controlled rate. The preform softens in the furnace and a glass fiber (also referred to as an optical fiber) is drawn freely from the molten end of the preform rod by a capstan located at the base of a draw tower. Because the surface of the glass fiber is susceptible to damage caused by abrasion, it is necessary to coat the fiber after it is drawn but before it comes into contact with any surface. Inasmuch as the application of a coating material must not damage the glass surface, the coating material is applied in a liquid state. Once applied, the coating material must solidify before the glass fiber reaches the capstan. This is typically accomplished within a brief time interval by photocuring—a process in which the liquid coating material is converted to a solid upon exposure to electromagnetic radiation, preferably ultraviolet (UV) light.

Because the fibers are thin and flexible, they are readily bent when subjected to mechanical stresses such as those encountered during handling or exposure to varying temperature environments. Such bends in the fiber frequently result in optical loss that is much greater than the intrinsic loss of the fiber itself, and it has been found desirable to protect the glass fiber against such bending. Accordingly, the coating material is required to cushion the glass fiber against bends and two layers of coating materials are typically applied to the drawn optical fiber. An inner (primary) coating, having a relatively low equilibrium modulus, is applied directly to the glass fiber; and an outer (secondary) coating, having a relatively high equilibrium modulus, surrounds the primary coating. Together, these coatings protect the inherently high tensile strength of the glass fiber as long as the primary coating remains bonded to the glass. Moreover, it is desirable for the primary coating to adhere to the glass fiber when pressure is applied. Adhesion is measured by a pull-out test that measures the force required to remove a 1 centimeter length of coating material from a coated glass fiber by pulling it along the longitudinal axis of the fiber. Low adhesion is a problem that, in the worst case, leads to "delamination" and the ensuing incursion of water, particularly upon exposure to high humidity, which attacks the glass surface and reduces tensile strength.

In what appears to be a contradictory requirement, it is also desirable to be able to easily strip the primary coating from the glass fiber—particularly when a number of fibers are bonded together in an array such as shown in U.S. Pat. No. 4,900,126. Such an array is frequently referred to as a "ribbon." Indeed, if the coating materials cannot be cleanly and easily stripped, then splicing and connectorizing operations will be seriously hampered.

U.S. Pat. No. 5,373,578 discloses a strippable coating material for an optical fiber that achieves improved strippability by the addition of a non-crosslinked hydrocarbon component as an additive. This particular coating material, however, exhibits a pull-out force that exceeds 3.0 pounds per centimeter of length (lb/cm) after 90 days aging, which is higher than desired.

U.S. Pat. No. 4,962,992 discloses desirable properties in an optical fiber coating material, and states that delamination may be prevented by controlling the adhesion level to be in the range of about 1 to 5 lb/cm. Nevertheless, it is desirable to have a low adhesion level without being susceptible to delamination.

What is needed is a coating material for an optical glass fiber that leaves a low residue on the glass after stripping, particularly from an array of glass fibers, while maintaining sufficient adhesion to the fibers so that delamination is avoided.

SUMMARY OF THE INVENTION

An optical fiber having a primary layer of protective coating material that surrounds an elongated strand of glass is designed for improved strippability. The primary layer has an equilibrium (in-situ) modulus that resides within the range 120 to 500 psi at 20° C., and a pull-out force (adhesion) that is less than 1.2 pounds per centimeter of length (lb/cm).

In an illustrative embodiment of the invention, the optical fiber includes two layers (primary and secondary) of radiation-cured polymeric materials surrounding the glass fiber and the equilibrium modulus of the primary coating resides within the range 120 to 500 psi. Also in the illustrative embodiment, a number of coated glass fibers are bonded together in an array with a radiation-curable, matrix bonding material to form a ribbon. A number of such ribbons are installed within a longitudinally extending core tube, which is surrounded by a plastic jacket to form an optical cable.

It has been found that by increasing the equilibrium modulus, delamination resistance is increased. This has allowed designers to decrease pull-out force while maintaining a suitable delamination resistance. As a result, coating materials can now be stripped away from a glass fiber with little or no residue.

BRIEF DESCRIPTION OF THE DRAWINGS

The invention and its mode of operation will be more clearly understood from the following detailed description when read with the appended drawing in which.

DETAILED DESCRIPTION

Figure 1:
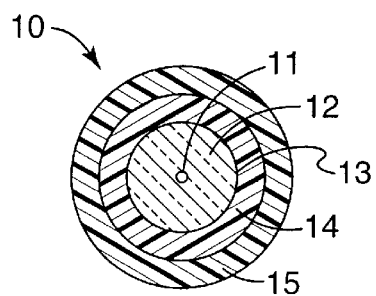
FIG. 1 is an end view, in cross section, of an optical fiber that includes a coating system in accordance with the present invention.

FIG. 1 shows an end view, in cross section, of a coated optical fiber 10 comprising a glass fiber 12 surrounded by a protective coating system comprising layers 14, 15. It is well known to draw glassy optical fiber from a specially prepared, cylindrical preform which has been locally and symmetrically heated to a temperature of about 2000° C. As the preform is fed into and through a furnace, glass fiber 12 is drawn from the molten material. A protective coating system is applied to the glass fiber 12 after it has been drawn from the preform that preferably comprises two layers of radiation-cured polymeric materials. An inner layer 14 contacts the glass fiber 12 at a glass-coating interface 13 and is referred to as a primary coating material. An outer layer 15, which is referred to as a secondary coating material, surrounds the inner layer. One method of applying dual layers of coating materials to a moving glass fiber is disclosed in U.S. Pat. No. 4,474,830 which issued on Oct. 2, 1984 to C. R. Taylor. Another method for applying dual layers of coating materials onto glass fiber is disclosed in U.S. Pat. No. 4,851,165, which issued on Jul. 25, 1989 to J. A. Rennell and C. R. Taylor. By way of illustration, the typical diameter of glass fiber 12 is about 125 micrometers, while the diameter of its core 11 is generally less than 10 micrometers for single mode fibers. (Core 11 is the region where light is substantially confined during its propagation along the glass fiber's longitudinal axis by the refractive index profile of the glass fiber.) And finally, each layer of coating material has a thickness of about 30 micrometers so that the overall diameter of coated fiber 10 is approximately 250 micrometers.

Coating Materials

Coating materials not only protect the glass fiber from abrasion and cushion it against microbending loss, but they also help preserve its tensile strength. However, in order to preserve tensile strength, the primary coating material must stay bonded to the glass—at least until it is stripped off, and then it is desirable that it be fully removable without leaving a residue on the glass. More specifically, the interface between the primary coating material and the glass fiber must be characterized by suitable strength to prevent delamination and must be such that the coating system can be easily stripped from the optical fiber without tenacious residues being left on the fiber surface. On the other hand, the surface of the secondary coating material must be such that tacking does not occur between adjacent convolutions of the fiber, resulting in a jerky payoff from a process spool.

Coating materials typically comprise urethane-acrylate liquids whose molecules become crosslinked when exposed to ultraviolet light. Various additives are also present that enhance one or more properties of the coating. For example, photoinitiators are added to accelerate the curing process which is important because coated optical fiber is wrapped around spools for storage as soon as it is cured, and manufacturing speed is critical to profitability. Curing is the conversion of the liquid coating material into a solid. In the present system this process is known as free-radical cure wherein, upon absorption of light, the photoinitiator components cleave to form free radical pairs, which diffuse away from each other and react with acrylate-terminated components to initiate a chain polymerization process. In addition to photoinitiators, coating materials further include diluents, antioxidants, adhesion promoters and, in some cases, additives to improve strippability. However, before addressing strippability, it is important to first discuss the composition of the primary coating material which makes contact with the glass surface, and whose properties are the subject of the present invention.

Figure 2:
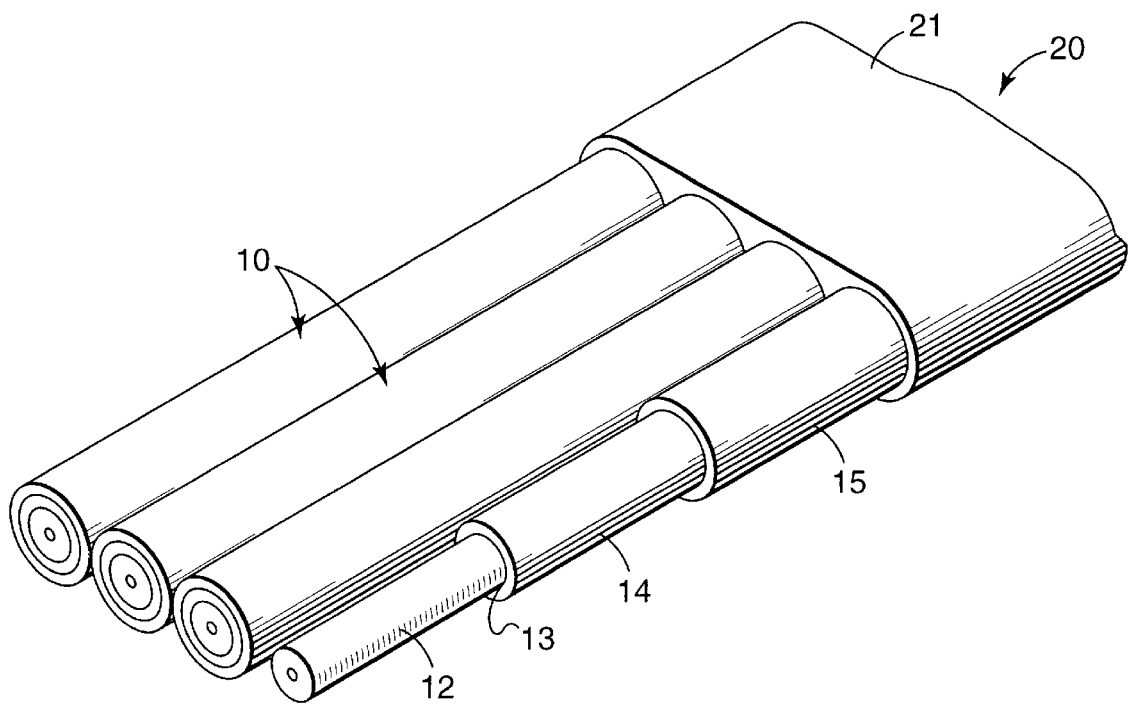
FIG. 2 is a perspective view of an optical fiber ribbon showing a group of coated glass fibers bonded together with a matrix material.

Referring now to FIG. 2, there is shown a perspective view of an optical fiber ribbon 20 showing a group of coated glass fibers 10—10 that are held together with an ultraviolet (UV)-curable matrix bonding material 21. The group of optical fibers are disposed in a coplanar parallel array, and while only four fibers are shown, such arrays typically comprise eight or more individual fibers. The equilibrium modulus of the matrix material has a value less than that of the outer coating layer of the fiber but greater than the equilibrium modulus of the inner coating layer. The matrix material 21 fills the interstices, bonds together the optical fibers, and extends to the outside boundary of the ribbon. Known UV-curable matrix materials 21 comprise a resin, a diluent and a photoinitiator. The resin may include a diethylenic-terminated resin synthesized from a reaction of a hydroxy-terminated alkyl acrylate with the reaction product of a polyester of polyether polyol of molecular weight of 1000 to 6000 Dalton with an aliphatic or aromatic diisocyanate, or a diethylenic-terminated resin synthesized from the reaction of glycidyl acrylate with a carboxylic-terminated polymer or polyether of molecular weight 1000 to 6000 Dalton. The diluent may comprise monofunctional or multifunctional acrylic acid esters having a molecular weight of 100 to 1000 Dalton or N-vinylpyrrolidinone. For the photoinitiator, the composition may include ketonic compounds such as diethoxyacetophenone, acetophenone, benzophenone, benzoin, anthraquinone, and benzil dimethyl ketal. In a typical composition, the bonding matrix may include a resin (50–90%), diluents (5–40%), and a photoinitiator (1–10%). All percentages are by weight unless otherwise noted. Other bonding matrices may include a methacrylate, an UV-curing epoxide or an unsaturated polyester. More detailed information regarding bonded arrays of optical fibers is available in the aforementioned U.S. Pat. No. 4,900,126.

Ribbon Stripping

Figure 3A:
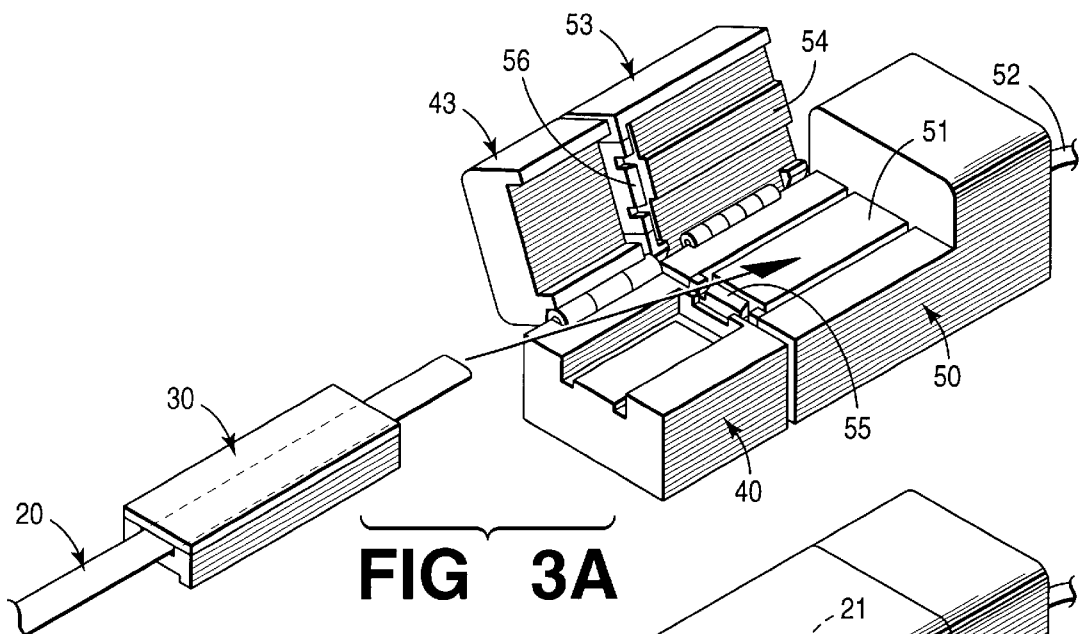
FIGS. 3A–3C illustrate the use of a ribbon-stripping tool showing three progressive stages in the removal of matrix and coating materials from a group of glass fibers.
Figure 3B:
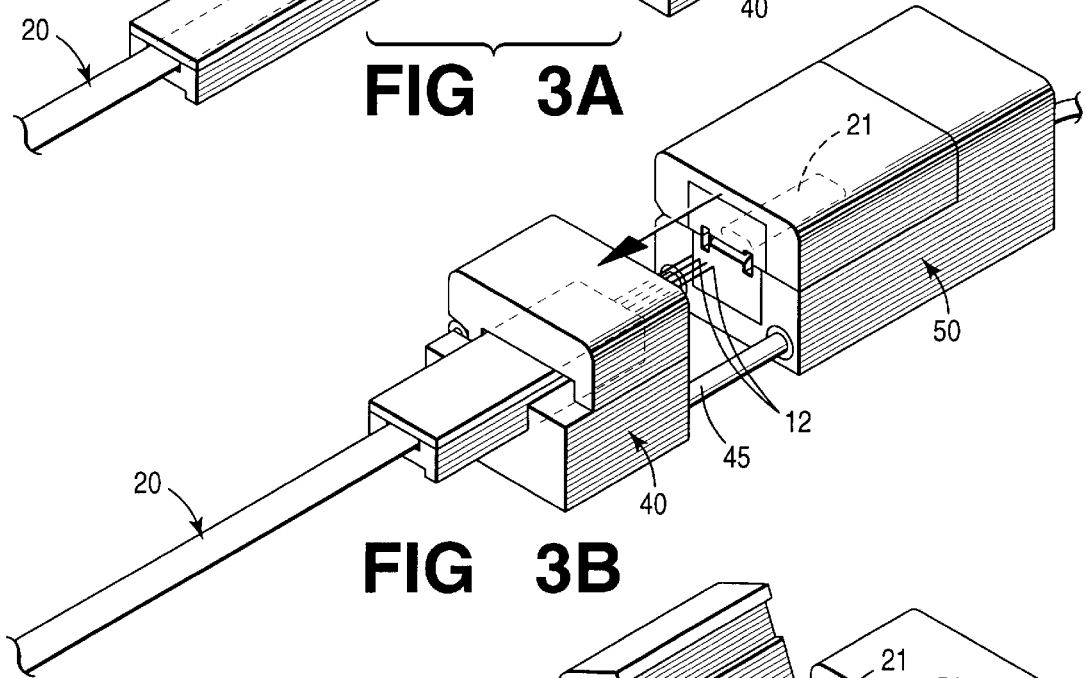
Figure 3C:
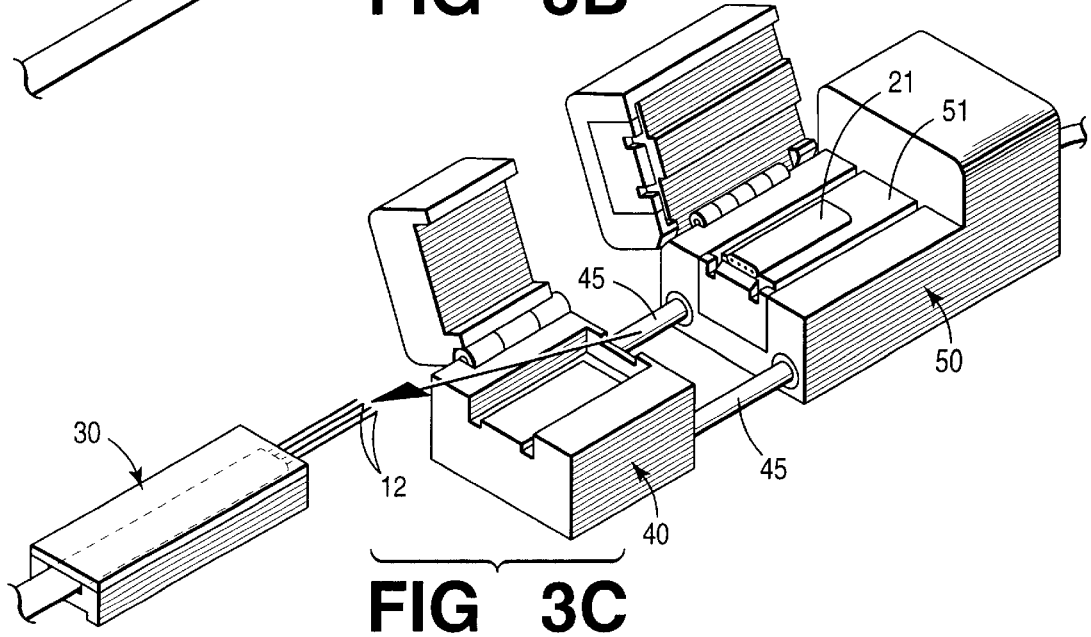

Reference is made to FIGS. 3A–3C, which illustrates use of a ribbon-stripping tool such as used by splicing technicians for mass fusion splicing. FIG. 3A shows the principal elements of the ribbon stripping tool and associated apparatus. Ribbon 20 is placed within fiber holder 30 to facilitate handling of the fiber during the stripping process. The stripping tool comprises a holder grip 40 and a main body 50 that are used for removing the various layers that surround a bonded fiber array. Lid 53 is closed during the stripping operation and includes an inner surface 54 which cooperates with a heated platen 51 to frictionally hold the outside jacket material surrounding the glass fibers within ribbon 20.

Referring first to FIG. 3A, fiber holder 30 is shown in its closed position around ribbon 20 which is about to be inserted into the ribbon-stripping tool. The portion of ribbon 20 which is to have its coating layers removed extends beyond the forward end of the fiber holder so that it can be captured between platen 51 and the inside surface 54 of lid 53 when the lid is closed onto the main body 50. Upon closure, opposing blades 55, 56 are positioned to cut partially into opposite sides of ribbon 20 so that a well-defined break in the coating material can be made. The particular tool used is electrically heated from an AC power source, which is converted to 12 volts DC for use by a heater element within the main body 50. Holder grip 40 is adapted to capture fiber holder 30 therein when its lid 43 is closed.

FIG. 3B illustrates the movement of holder grip 40 away from the main body 50 of the ribbon-stripping tool. Guide rails 45—45 allow the holder grip to slide into engagement with the main body in a controlled manner. A heater (not shown) within the main body raises the temperature of platen 51 to a predetermined level which weakens/breaks the adhesive bond at the interface 13 between primary coating 14 and glass fiber 12 (see FIG. 1 or 2) of the various coated fibers. Illustratively, a temperature of 100° C. for about 2 minutes provides acceptable results. Once the bond is weakened/broken the rest of the operation involves sliding the primary coating along the glass fiber surface. The ability of the primary coating to slide will depend on it sliding friction with the glass fiber. This action will determine how easily the composite (matrix 21 and coatings 14, 15) can be removed and the amount of residue that remains on the bare glass fibers.

Figure 4A:
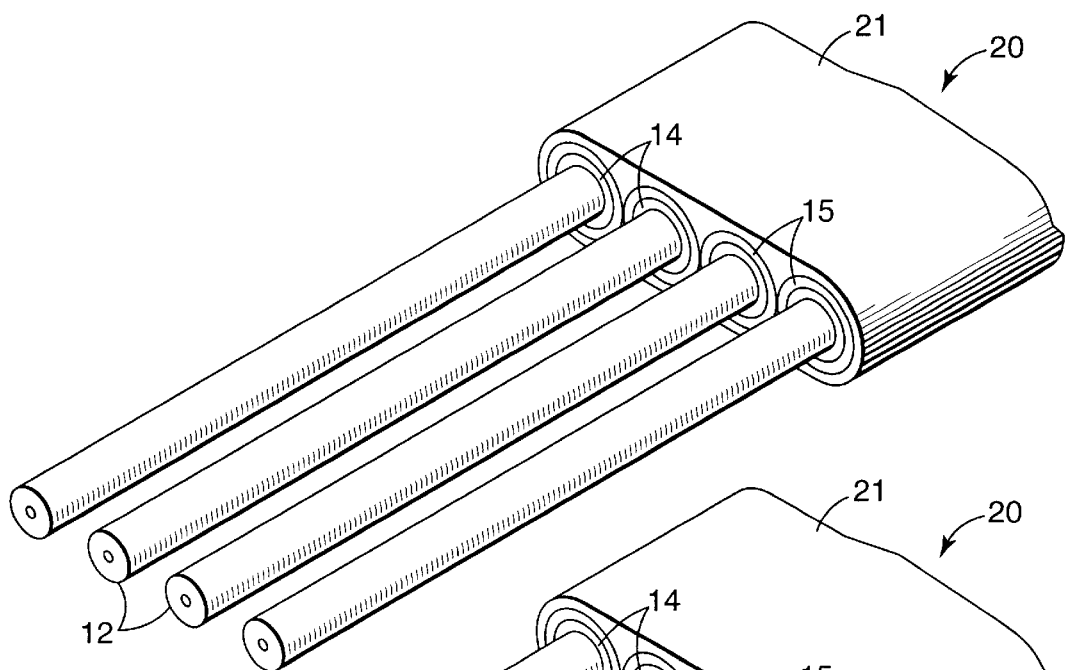
FIGS. 4A–4C illustrate various outcomes of the ribbon-stripping procedure.
Figure 4B:
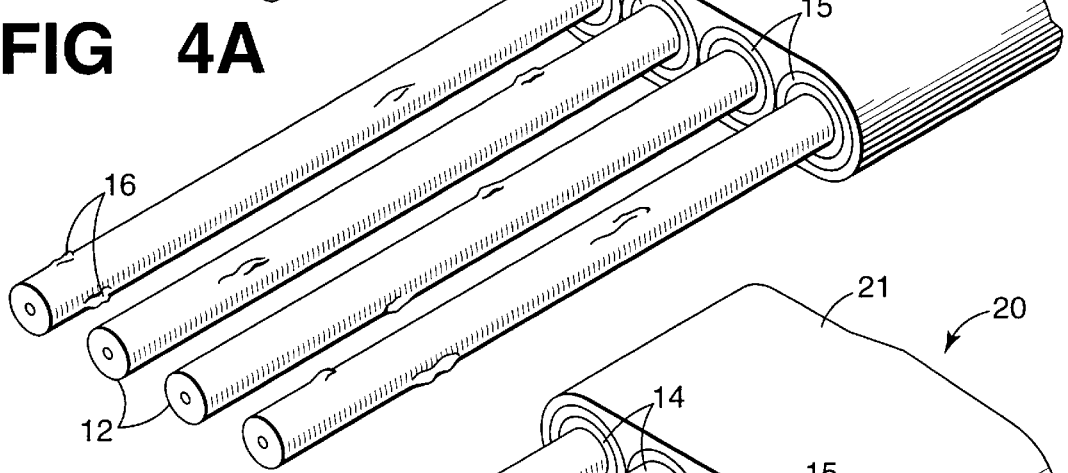
Figure 4C:
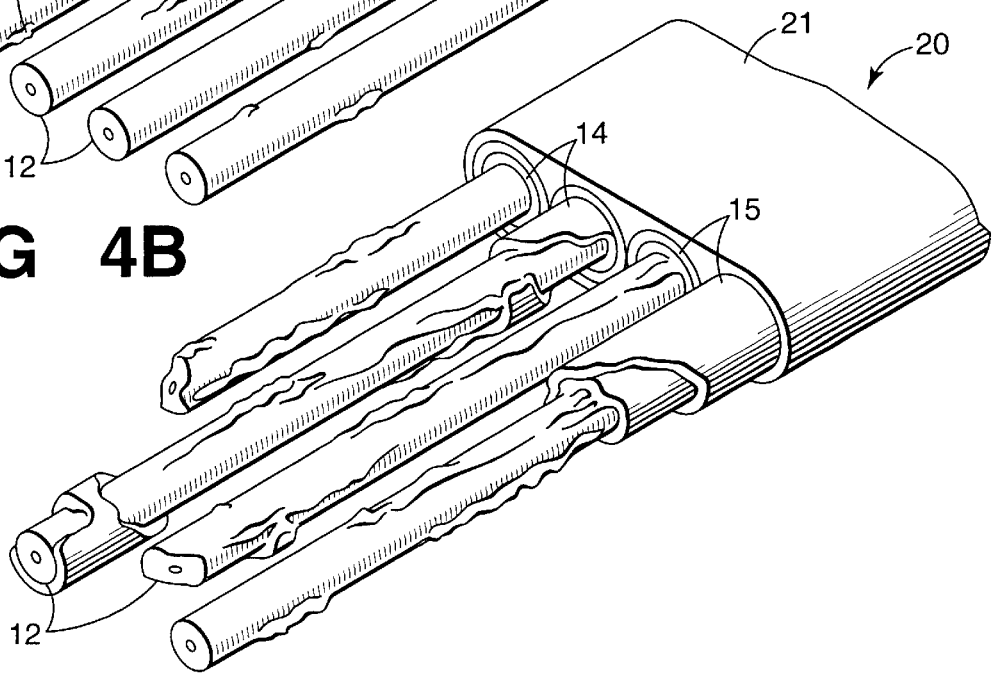

Finally, FIG. 3C shows end results of the ribbon stripping process in which glass fibers 12—12 protrude from ribbon 20 which is still held within the fiber holder 30. And matrix material 21, which has just been stripped away, remains on the heated platen 51 of the main body 50. Having stripped the matrix and coating materials away from the glass fibers 12—12, FIGS. 4A–4C are used for illustrating the various possible results of the stripping process and for discussing their acceptability. For example, FIG. 4A shows an ideal condition wherein the matrix 21 and coating materials 14, 15 are fully removed from the glass fibers 12—12. Such results are frequently possible with the present invention although the presence of some residues 16—16, as shown in FIG. 4B, is also acceptable provided they can be removed by gentle wiping with an alcohol-moistened cotton swab. However, FIG. 4C illustrates an unacceptable condition in which the coating materials have clung to the glass fibers so tenaciously that either breakage occurs or large patches remain that cannot be easily removed.

Figure 5:
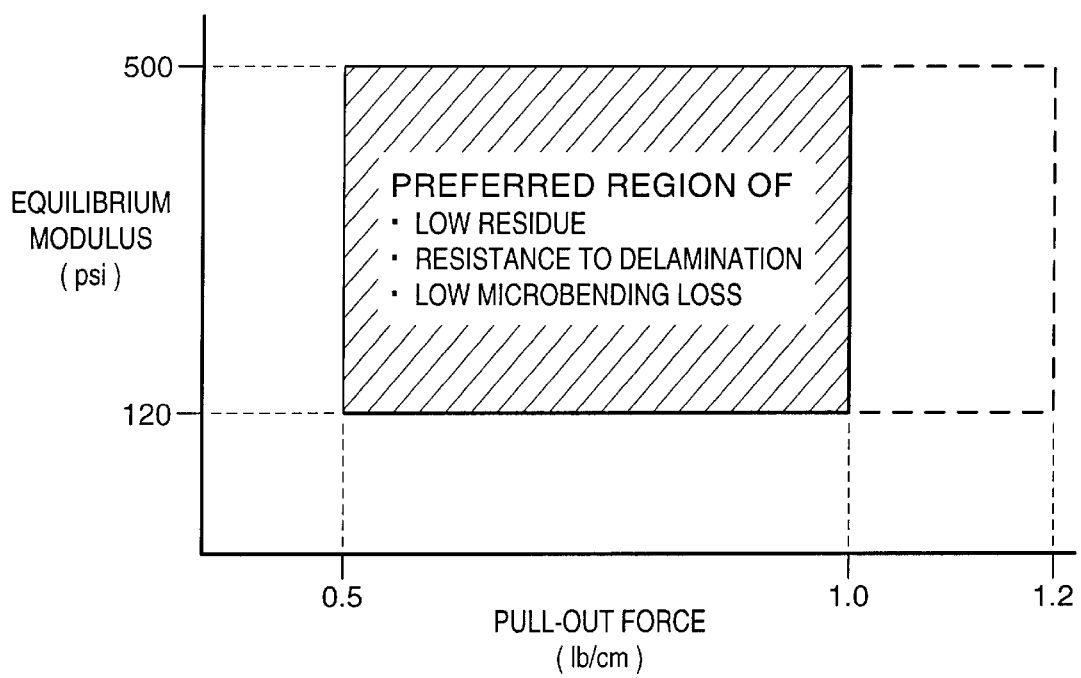
FIG. 5 is a graph that plots the combined ranges of equilibrium modulus and pull-out force that are associated with optical fiber primary coatings in accordance with the present invention.

FIG. 5 is a graph that plots the combined ranges of equilibrium modulus and pull-out force (adhesion) that are associated with optical fiber primary coatings in accordance with the present invention. This graph discloses a region of excellent performance, which has been found to provide low residue, resistance to delamination and low microbending loss. Surprisingly, it is possible to obtain reduced pull-out forces (values below 1.2 lb/cm, preferably 0.5–1.0 lb/cm) for some formulations whose moduli are higher than 120 psi. As a result, coating materials can now be stripped away from a glass fiber with little or no residue, which is particularly important in situations where a group of such fibers are bound together in an array by a matrix bonding material. This being said, it is noted that the chemical structures and/or relative amounts of the constituent components of the primary coating material can be modified to control equilibrium modulus and pull-out force independently. Nevertheless, it should be kept in mind that any such modifications must be judiciously made to keep the viscosity of the formulation within acceptable limits (typically between 1000 and 80,000 centipoise (cP), and preferably between 3000 and 10,000 cP).

For the same family of coatings, the equilibrium modulus typically reflects the pull-out behavior (i.e., as the pull-out force increases, so does the equilibrium modulus). Surprisingly, it was discovered by extensive experimentation that there was no clear relationship between delamination resistance and pull-out when the modulus was held constant. In other words, the delamination resistance does not decrease with decreasing pull-out as one would expect. In fact, based on a compressive loading method, fibers having lowest pull-out value showed the highest resistance to delamination. In the compressive test method, a stationary fiber strand held against a rigid surface is subjected to increasing loads until delaminations are observed. The greater the equilibrium modulus of the primary coating, the greater the load required to create an equivalent percentage of delaminations. In fact, the relationship between the primary coating equilibrium modulus and the load required to create 100% delaminations is linear. As a practical matter, an upper limit for the equilibrium modulus of the primary coating is about 500 psi at 20° C. where microbending losses become unacceptably high. This is because the primary coating material is too stiff to adequately cushion the glass fiber.

In illustrative embodiments of the invention the primary coating comprises an urethane-acrylate oligomer (25–85% by weight) having a molecular weight 1000 to 6000 grams/mole; a monofunctional acrylate monomer with aromatic moiety (0–70%) having a molecular weight 150–900 grams/mole; a monofunctional aliphatic acrylate (0–50%) having a molecular weight 100–500 grams/mole; a photoinitiator (0.1–10%); and an adhesion promoter (0–5%).

Equilibrium Modulus

The crosslink density of a coating material corresponds to the plateau or "equilibrium" modulus on the $\epsilon'$ (storage modulus) curve. The equilibrium modulus (also known as the in-situ modulus) of the primary coating can be altered by modifying the crosslink density. Specifically, the modulus can be increased by:

1. Lowering the molecular weight of the difunctional urethane acrylate oligomer.
2. Increasing the relative amount of difunctional monomer(s).
3. Increasing the relative amount of difunctional urethane acrylate oligomer with respect to monofunctional monomer.
4. Decreasing the relative amount of monofunctional monomer(s).
5. Eliminating or decreasing the relative amount of chain transfer agent (if present). It is noted that some adhesion promoters (e.g., $\gamma$-mercaptopropyl trimethoxysilane) also act as chain transfer agents.

Conversely, the modulus can be decreased by:

1. Raising the molecular weight of the difunctional urethane acrylate oligomer.
2. Decreasing the relative amount of difunctional monomer.
3. Decreasing the relative amount of difunctional urethane acrylate oligomer with respect to monofunctional monomer.
4. Increasing the relative amount of monofunctional monomer(s).
5. Adding a chain transfer agent.
6. Decreasing the effective functionality of the urethane acrylate oligomer.

EXAMPLES

Decreasing The In Situ Modulus By Adding A Chain Transfer Agent

Formulation A 80 parts-by-weight of ARU-339 (a difunctional urethane acrylate oligomer, which is commercially available from the Echo Resins company;

20 parts-by-weight of 2-(2-ethoxyethoxy) ethyl acrylate (a monofunctional monomer, which is commercially available from the Sartomer company as SR-256); and 2 parts-by-weight of Irgacure 1700 (a photoinitiator, which is commercially available from the Ciba company.

The equilibrium modulus of this formulation, after curing with ultraviolet (UV) radiation with a dose of about one J/cm$^2$, was 800 psi.

Formulation B 80 parts-by-weight of ARU-339 (a difunctional urethane acrylate oligomer, which is commercially available from the Echo Resins company;

15 parts-by-weight of 2-(2-ethoxyethoxy) ethyl acrylate (a monofunctional monomer, which is commercially available from the Sartomer company as SR-256);

5 parts-by weight of isooctyl mercaptopropionate (a chain transfer agent, which is commercially available from the Hampshire Chemical Corp.); and 2 parts-by-weight of Irgacure 1700 (a photoinitiator, which is commercially available from the Ciba Corp.

The equilibrium modulus of this formulation, after curing with ultraviolet (UV) radiation with a dose of about one J/cm$^2$, was 348 psi.

Increasing The In Situ Modulus By Replacing A Monofunctional Monomer With A Difunctional Monomer Formulation C 40 parts-by-weight of ARU-339 (a difunctional urethane-acrylate oligomer, which is commercially available from the Echo Resins Corp.;

53 parts-by-weight of ethoxylated nonyl-phenol acrylate (a monofunctional monomer, which is commercially available from the Sartomer Corp. as SR-504);

5 parts-by-weight of lauryl acrylate (a monofunctional monomer, which is commercially available from the Sartomer Corp. as SR-335);

2 parts-by weight of isooctyl mercaptopropionate (a chain transfer agent, which is commercially available from the Hampshire Chemical Corp.); and 2 parts-by-weight of Irgacure 1700 (a photoinitiator, which is commercially available from the Ciba Corp.

The equilibrium modulus of this formulation, after curing with ultraviolet (UV) radiation with a dose of about one J/cm$^2$, was 58 psi.

Formulation D 40 parts-by-weight of ARU-339 (a difunctional urethane-acrylate oligomer, which is commercially available from the Echo Resins Corp.;

53 parts-by-weight of ethoxylated nonyl-phenol acrylate (a monofunctional monomer, which is commercially available from the Sartomer Corp. as SR-504);

5 parts-by-weight of hexanediol diacrylate (a difunctional monomer, which is commercially available from the Sartomer Corp. as SR-238);

2 parts-by weight of isooctyl mercaptopropionate (a chain transfer agent, which is commercially available from the Hampshire Chemical Corp.); and 2 parts-by-weight of Irgacure 1700 (a photoinitiator, which is commercially available from the Ciba Corp.

The equilibrium modulus of this formulation, after curing with ultraviolet (UV) radiation with a dose of about one J/cm$^2$, was 189 psi.

Adhesion

The adhesion of a primary coating to the glass fiber depends on the polar interactions between the polymer and the silica glass, on the extent of covalent bonding (if any) between the polymer and the silica surface, and on the presence of any surfactants or lubricants that may migrate to the interface between the polymer and the glass. The adhesion of a primary coating to glass can be increased by:

1. Increasing the polarity of the oligomer and/or the monomers (for example, increasing the content of urethane, ester, hydroxyl, or carboxylic acid moieties, or increasing the relative oxygen content).
2. Adding an adhesion promoter or coupling agent—a molecule that can bond covalently to the silica on one side and to the polymer on the other side (for example γmercaptopropyl trimethoxysilane, 3-acryloxypropyl trimethoxysilane, 3-methacryloxypropyl trimethoxysilane, 3-aminopropyl trimethoxysilane).

Conversely, adhesion can be reduced by:

1. Lowering the polarity [for example reducing the content of urethane, ester, hydroxyl, or carboxylic acid moieties, reducing the relative oxygen content (i.e., increasing the hydrocarbon content—see U.S. Pat. No. 5,373,578, which is hereby incorporated by reference), or adding siloxane or fluorinated moieties].
2. Eliminating or reducing the concentration of coupling agents.
3. Adding a surfactant or lubricant [e.g., polydimethylsiloxane, functionalized polydimethylsiloxanes, octadecyltrimethyoxysilane, or fluorinated surfactants such as those sold by 3M under the trade name Fluorad (e.g., adding 0.5% by weight of Fluorad FC-430)]

Figure 6:
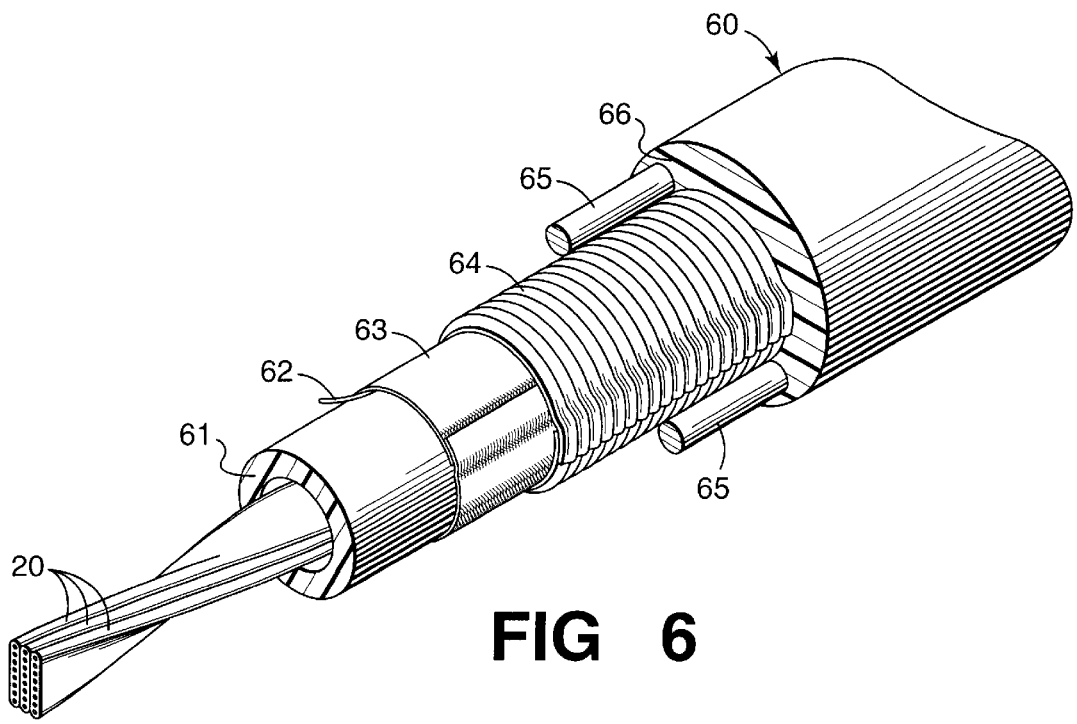
FIG. 6 discloses a cable having a number of optical fiber ribbons.

Bonded arrays of optical fibers, as discussed above, are commercially available from Lucent Technologies Inc. under the trademark of AccuRibbon® lightguide cable, which is especially useful for high fiber count installations in the loop and metropolitan area networks where splicing and installation productivity are paramount. Each ribbon comprises twelve color-coded fibers for easy identification, and as many as twelve ribbons are stacked together for high density. The ribbon stack is surrounded by a core tube that may also contain a filler that prevents the incursion of water in outside plant applications. FIG. 6 provides greater detail regarding the construction of a practical cable according to the present invention. Optical cable 60 includes ribbons 20 as discussed above. These ribbons are disposed within a tubular member 61, which is made from a dielectric material such as polyvinyl chloride or polyethylene, for example. Surrounding tubular member 61 is a water-absorbing tape 63, a corrugated metallic shield 64, and plastic jacket 66. A ripcord 62, made of Keviar® plastic, facilitates sheath removal, and jacket 66 of polyethylene material, for example, encloses strength members 65—65. Strength members are used to eliminate or reduce stresses that might otherwise be applied to the optical fibers during handling or normal service, and may be included within the cable 60 in any number of known ways. Typically, a filling material is disposed within the tubular member 61 that serves to cushion the fibers contained therein, thereby protecting against microbending loss. Greater detail regarding the construction of cable 60 and suitable filling materials are disclosed in U.S. Pat. No. 4,844,575, which is hereby incorporated by reference.

Although various particular embodiments of the present invention have been shown and described, modifications are possible within the scope of the invention. These modifications include, but are not limited to the use of different techniques and materials for increasing/decreasing the equilibrium modulus of the primary coating material, and the use of different techniques and materials for increasing/decreasing adhesion of the primary coating material.

What is claimed is:

1. An optical fiber coated with a radiation-cured primary coating of polymeric material, the optical fiber comprising an elongated strand of glass that is adapted to guide lightwaves along its length, the primary coating of polymeric material being
CHARACTERIZED BY
   an equilibrium modulus that resides within the range 120 to 500 psi at 20° C.; and
   a pull-out force that resides within the range 0.5 to 1.2 lb/cm.

2. The optical fiber of claim 1 wherein the pull-out force is within the range 0.5 to 1.0 lb/cm.

3. The optical fiber of claim 1 wherein the primary coating material comprises a urethane-acrylate oligomer, one or more monomers, and a photoinitiator.

4. The optical fiber of claim 1 wherein the primary coating materials comprise:
   a difunctional acrylate oligomer in an amount between 25% and 85% by weight;
   a monofunctional acrylate monomer with aromatic moiety in an amount less than 70% by weight;
   a monofunctional aliphatic acrylate in an amount less than 50% by weight;
   a photoinitiator in an amount between 0.1% and 10% by weight; and
   an adhesion promoter in an amount less than 5% by weight.

5. The optical fiber of claim 1 further including a secondary layer of coating material that surrounds the primary layer of coating material, the secondary layer having a substantially higher equilibrium modulus than the primary coating material.

6. The optical fiber of claim 1 wherein a plurality of said fibers are disposed in a longitudinal array with longitudinal axes thereof being substantially parallel to one another, said fibers being surrounded by a matrix bonding material that fills interstices between adjacent optical fibers and extends to a periphery that envelops the array.

7. The bonded array of claim 6 wherein said bonded array is substantially flat.

8. The optical fiber of claim 1 wherein a plurality of the fibers are disposed in a core tube that extends along a longitudinal axis of a cable, the cable including: (i) a plastic jacket that encloses the core tube, and (ii) strength members having tensile stiffness for receiving loads applied to the cable.

9. The optical fiber of claim 8 wherein said fibers are positioned in a longitudinal array with longitudinal axes thereof being substantially parallel to one another, said fibers being surrounded by a matrix bonding material that fills interstices between adjacent optical fibers and extends to a periphery that envelops the array.

10. A bonded array of transmission media, which comprises:
   a plurality of longitudinally extending optical fibers that are disposed in an array with longitudinal axes thereof being substantially parallel to one another, each of said optical fibers including at least one layer of a coating material having an equilibrium modulus within the range 120 to 500 psi at 20° C., and a pull-out force that is within the range 0.5 to 1.2 lb/cm; and
   a matrix bonding material that fills interstices between adjacent optical fibers of the array and extends to a periphery that envelops the array.

11. The bonded array of claim 10 wherein the layer of coating material comprises a urethane-acrylate oligomer, one or more monomers, and a photoinitiator.

12. The bonded array of claim 10 wherein a plurality of said bonded arrays are disposed in a core tube that extends along a longitudinal axis of a cable, the cable including: (i) a plastic jacket that encloses the core tube, and (ii) strength members having tensile stiffness for receiving loads applied to the cable.

13. The bonded array of claim 10 wherein said bonded array is substantially flat.

* * * * *